US012623567B2

(12) United States Patent
Wang et al.

(10) Patent No.: US 12,623,567 B2
(45) Date of Patent: May 12, 2026

(54) CHARGING SOCKET, CHARGING SOCKET UPGRADING METHOD AND APPARATUS, DEVICE, AND STORAGE MEDIUM (AMENDED)

(71) Applicant: Changchun Jetty Automotive Technology Co., Ltd., Jilin (CN)

(72) Inventors: Chao Wang, Jilin (CN); Yun Miao, Jilin (CN)

(73) Assignee: Changchun Jetty Automotive Technology Co., Ltd., Changchun (CN)

( * ) Notice: Subject to any disclaimer, the term of this patent is extended or adjusted under 35 U.S.C. 154(b) by 276 days.

(21) Appl. No.: 18/686,766

(22) PCT Filed: Aug. 9, 2022

(86) PCT No.: PCT/CN2022/111138
§ 371 (c)(1),
(2) Date: Feb. 26, 2024

(87) PCT Pub. No.: WO2023/024895
PCT Pub. Date: Mar. 2, 2023

(65) Prior Publication Data
US 2024/0286521 A1 Aug. 29, 2024

(30) Foreign Application Priority Data
Aug. 26, 2021 (CN) .......................... 202110985980.5

(51) Int. Cl.
*B60L 53/68* (2019.01)
*B60L 53/16* (2019.01)
*G06F 8/65* (2018.01)

(52) U.S. Cl.
CPC ................ *B60L 53/68* (2019.02); *G06F 8/65* (2013.01); *B60L 53/16* (2019.02)

(58) Field of Classification Search
None
See application file for complete search history.

(56) References Cited

U.S. PATENT DOCUMENTS

2013/0132939 A1    5/2013    Murata et al.
2017/0141608 A1    5/2017    Stenger et al.
(Continued)

FOREIGN PATENT DOCUMENTS

CN    107577473 A    1/2018
CN    107748670 A    3/2018
(Continued)

OTHER PUBLICATIONS

International Searching Authority, "International Search Report," issued in connection with International Patent Application No. PCT/CN2022/111138, dated Oct. 10, 2022, 6 pages. [English translation included].
(Continued)

*Primary Examiner* — Ryan D. Coyer
(74) *Attorney, Agent, or Firm* — Hanley, Flight & Zimmerman, LLC

(57) ABSTRACT

The present disclosure provides a charging socket, a charging socket upgrading method and apparatus, a device, and a storage medium. The method includes: receiving a new application program in an upgrade package, and checking whether the new application program in the upgrade package is valid (S001); if so, writing the new application program in the upgrade package into a memory activation area of a charging socket for an upgrade (S002); determining whether the upgrade is successful, and if so, setting a flag position of the charging socket to mark the success of the upgrade (S003). According to the described method, the
(Continued)

charging socket can be upgraded by the aforementioned method, thereby improving the applicability of the upgrading process.

16 Claims, 7 Drawing Sheets

(56) References Cited

U.S. PATENT DOCUMENTS

| | | | |
|---|---|---|---|
| 2019/0050217 A1 | 2/2019 | Tatourian | |
| 2019/0138296 A1 | 5/2019 | Ishikawa et al. | |
| 2019/0354361 A1* | 11/2019 | Li | H02J 50/12 |
| 2020/0047637 A1 | 2/2020 | Nakao et al. | |
| 2020/0183674 A1 | 6/2020 | Tateishi et al. | |
| 2020/0272450 A1 | 8/2020 | Inoue et al. | |
| 2021/0255805 A1* | 8/2021 | Harata | G06F 8/65 |

FOREIGN PATENT DOCUMENTS

| | | | | |
|---|---|---|---|---|
| CN | 108710499 A | | 10/2018 | |
| CN | 108958777 A | | 12/2018 | |
| CN | 110134414 A | * | 8/2019 | G07F 15/006 |
| CN | 111645547 A | * | 9/2020 | B60L 53/68 |
| CN | 111698307 A | | 9/2020 | |
| CN | 112440802 A | | 3/2021 | |
| CN | 112677770 A | | 4/2021 | |
| CN | 113094072 A | | 7/2021 | |
| CN | 113656056 A | | 11/2021 | |
| JP | 2009053920 A | | 3/2009 | |
| JP | 201820718 A | | 2/2018 | |
| JP | 2018073245 A | | 5/2018 | |
| JP | 201984941 A | | 6/2019 | |
| JP | 202028150 A | | 2/2020 | |
| KR | 20110129517 A | | 12/2011 | |
| KR | 20150052514 A | | 5/2014 | |
| KR | 20200086480 A | * | 7/2020 | G06F 13/4282 |
| WO | 2016180075 A1 | | 11/2016 | |

OTHER PUBLICATIONS

International Searching Authority, "Written Opinion," issued in connection with International Patent Application No. PCT/CN2022/111138, dated Oct. 10, 2022, 8 pages. [English machine translation included].

The State Intellectual Property Office of People's Republic of China, "First Office Action," issued in connection with Chinese Patent Application No. 202110985980.5, dated Sep. 1, 2023, 15 pages. [English translation included].

China National Intellectual Property Administration, "First Search Report," issued in connection with Chinese Patent Application No. 202110985980.5, dated Sep. 1, 2023, 7 pages. [English translation included].

European Patent Office, "Extended European Search Report" issued on Nov. 21, 2024 in connection with European patent application No. 22860241.3, 10 pages.

Japan Patent Office, "Office Action", issued in connection with JP Patent Application No. 2024-513149 on Mar. 5, 2025, 10 pages (English Translation Included).

Japan Patent Office, "Decision of Refusal," issued in connection with Japanese Patent Application No. 2024-513149, dated Jul. 17, 2025, 4 pages. [with English Translation].

* cited by examiner

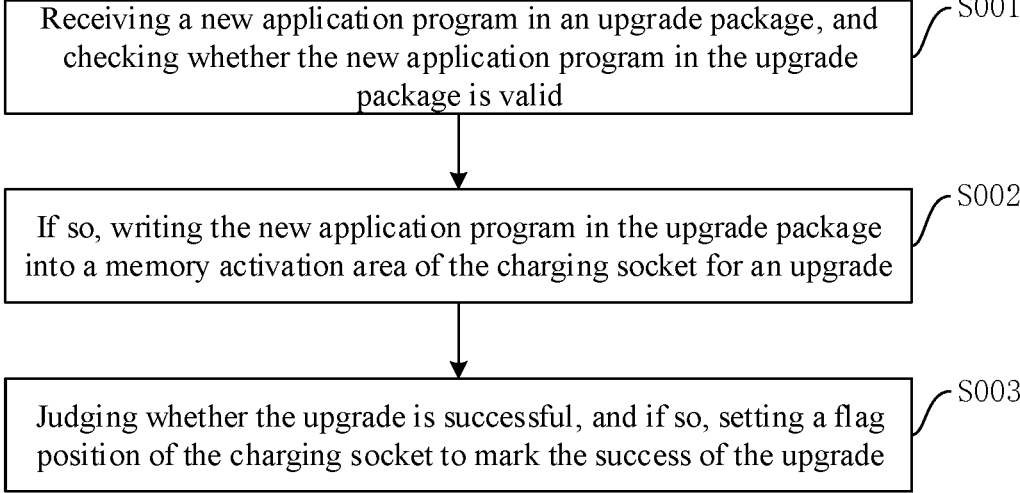

Receiving a new application program in an upgrade package, and checking whether the new application program in the upgrade package is valid — S001

If so, writing the new application program in the upgrade package into a memory activation area of the charging socket for an upgrade — S002

Judging whether the upgrade is successful, and if so, setting a flag position of the charging socket to mark the success of the upgrade — S003

FIG.1

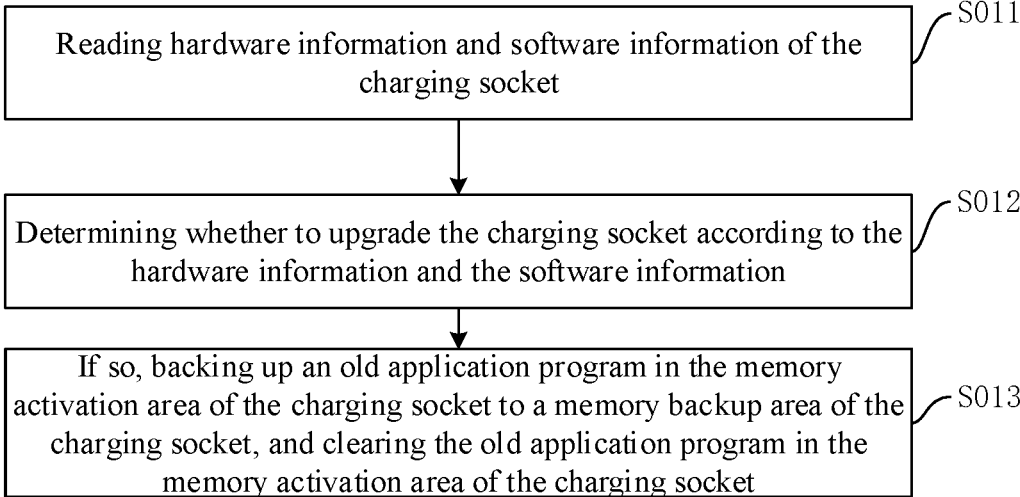

Reading hardware information and software information of the charging socket — S011

Determining whether to upgrade the charging socket according to the hardware information and the software information — S012

If so, backing up an old application program in the memory activation area of the charging socket to a memory backup area of the charging socket, and clearing the old application program in the memory activation area of the charging socket — S013

FIG.2

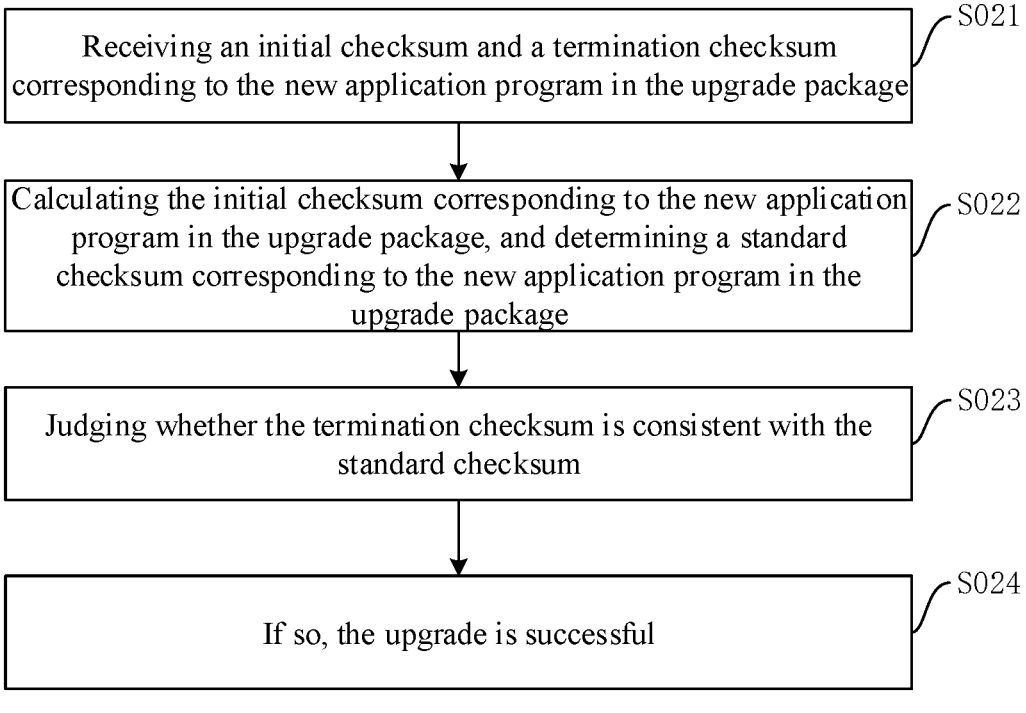

Receiving an initial checksum and a termination checksum corresponding to the new application program in the upgrade package ⟋ S021

Calculating the initial checksum corresponding to the new application program in the upgrade package, and determining a standard checksum corresponding to the new application program in the upgrade package ⟋ S022

Judging whether the termination checksum is consistent with the standard checksum ⟋ S023

If so, the upgrade is successful ⟋ S024

FIG.3

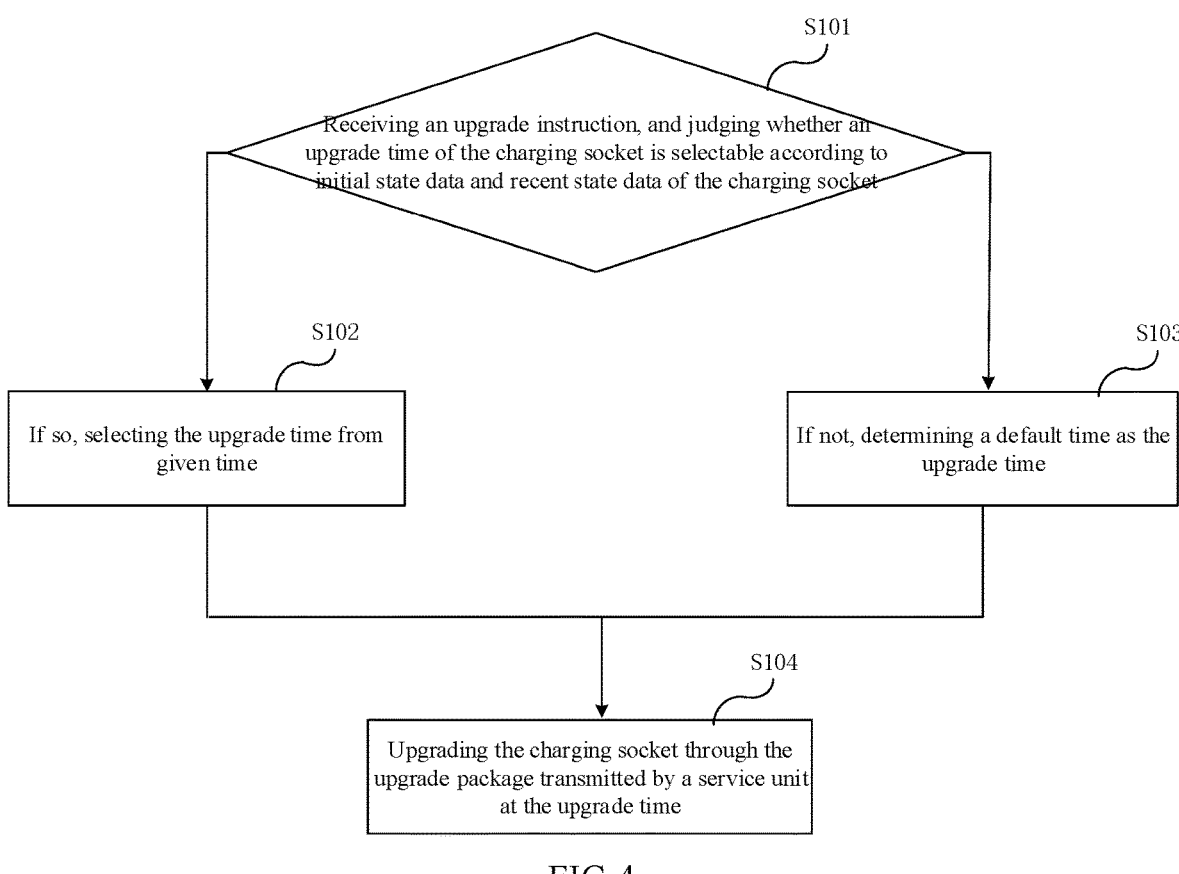

S101

Receiving an upgrade instruction, and judging whether an upgrade time of the charging socket is selectable according to initial state data and recent state data of the charging socket

S102

If so, selecting the upgrade time from given time

S103

If not, determining a default time as the upgrade time

S104

Upgrading the charging socket through the upgrade package transmitted by a service unit at the upgrade time

FIG.4

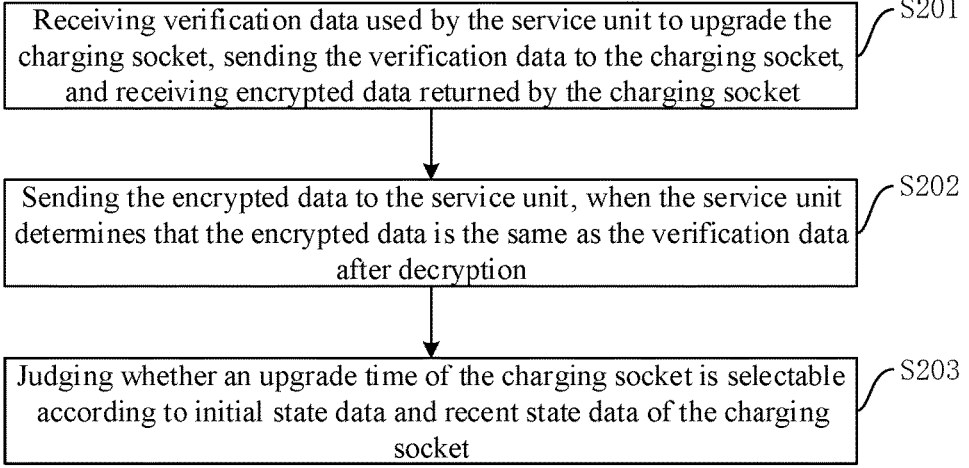

Receiving verification data used by the service unit to upgrade the charging socket, sending the verification data to the charging socket, and receiving encrypted data returned by the charging socket    S201

Sending the encrypted data to the service unit, when the service unit determines that the encrypted data is the same as the verification data after decryption    S202

Judging whether an upgrade time of the charging socket is selectable according to initial state data and recent state data of the charging socket    S203

FIG.5

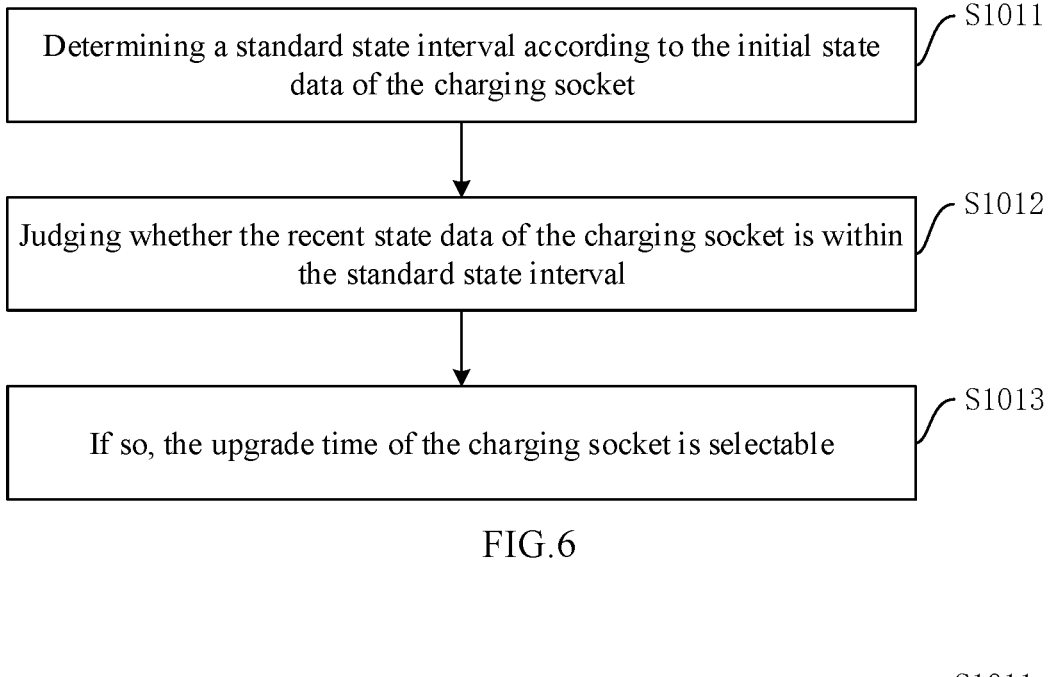

Determining a standard state interval according to the initial state data of the charging socket                    S1011

Judging whether the recent state data of the charging socket is within the standard state interval                    S1012

If so, the upgrade time of the charging socket is selectable                    S1013

FIG.6

Eliminating abnormal data in the initial state data of the charging socket                    S1011a Determining a standard value and an error value of the initial state data                    S1011b Determining the standard state interval according to the standard value and the error value                    S1011c

FIG.7

Comparing the recent state data with the initial state data, and judging whether the recent state data is consistent with the initial state data ⌐ S1014

If so, the upgrade time of the charging socket is selectable ⌐ S1015

CHARGING SOCKET, CHARGING SOCKET UPGRADING METHOD AND APPARATUS, DEVICE, AND STORAGE MEDIUM (AMENDED)

CROSS-REFERENCE TO RELATED APPLICATION

This application is a U.S. National Stage of International Application No. PCT/CN2022/111138, filed Aug. 9, 2022, which claims priorities to Chinese Patent Application No. 202110985980.5, filed on Aug. 26, 2021, both of which are hereby incorporated by reference in their entireties.

TECHNICAL FIELD

The present disclosure relates to the field of charging sockets, and particularly to a charging socket, a charging socket upgrading method and apparatus, a device, and a storage medium.

BACKGROUND

With the rapid development of new energy industry, the number of electric automobiles is gradually increasing, and the demand for safety, reliability and timeliness of charging devices is also increasing. An automobile control unit (ECU) is equivalent to the brain of an automobile, and is connectable to electronic components on the automobile. A unified diagnosis service (UDS) of the automobile is a unified international standard formulated to realize an automobile electronic fault diagnosis service, and the ECU and the electronic components need to be communicated with each other under the UDS.

A charging socket is an apparatus mounted on the electric automobile and connected to a charging interface. The charging socket itself may be damaged due to a too high or too low temperature, a vibration, an impact or the like. In the existing electric automobiles, the charging socket not only has the function of charging through a connection with the charging interface, but also can monitor part of the states of the charging socket.

However, in the prior art, only the states of the charging socket can be monitored, and there is no method for upgrading the charging socket. Although there are methods for upgrading other electronic components of the electric automobile in the prior art, the upgrade cannot be carried out according to the usage or state of the electronic components, which leads to the failure to make corresponding changes in the upgrading process according to the actual situations of the electronic components, and the applicability is limited. Therefore, there is an urgent need for a charging socket upgrading method to upgrade the charging socket, so as to improve the applicability of the upgrading process.

SUMMARY

The embodiments of the present disclosure aim to provide a charging socket, a charging socket upgrading method and apparatus, a device and a storage medium, so as to upgrade the charging socket and improve the applicability of the upgrading process.

In order to achieve the above objective, in an aspect, an embodiment of the present disclosure provides a charging socket upgrading method, which is applied to an automobile control unit, the method comprising:

receiving a new application program in an upgrade package, and checking whether the new application program in the upgrade package is valid;

if so, writing the new application program in the upgrade package into a memory activation area of the charging socket for an upgrade; and judging whether the upgrade is successful, and if so, setting a flag position of the charging socket to mark the success of the upgrade.

In another aspect, an embodiment of the present disclosure provides a charging socket, comprising a central control module and a monitoring module electrically connected thereto;

the monitoring module is configured to collect state information of the charging socket and transmit the state information to the central control module; and the central control module is electrically connected to an automobile control unit, and configured to transmit the state information to the automobile control unit and upgrade at an upgrade time under the control of the automobile control unit.

In still another aspect, an embodiment of the present disclosure provides a charging socket upgrading apparatus, which is applied to an automobile control unit, the apparatus comprising:

a receiving module configured to receive a new application program in an upgrade package and check whether the new application program in the upgrade package is valid;

an upgrading module configured to write the new application program in the upgrade package into a memory activation area of the charging socket for an upgrade, if the new application program in the upgrade package is valid; and a judging module configured to judge whether the upgrade is successful, and if so, set a flag position of the charging socket to mark the success of the upgrade.

In still another aspect, an embodiment of the present disclosure provides a computer device, comprising a memory, a processor, and a computer program stored in the memory, in which when executed by the processor, the computer program performs instructions of any of the aforementioned methods.

In still another aspect, an embodiment of the present disclosure provides a computer-readable storage medium in which a computer program is stored, in which when executed by a processor of a computer device, the computer program performs instructions of any of the aforementioned methods.

As can be seen from the above technical solutions according to the embodiments of the present disclosure, in the embodiments of the present disclosure a backup process of the old application program is firstly carried out on the premise that the new application program in the upgrade package is checked to be effective, and then the upgrade of the new application program is carried out, so that the applicability and the upgrade efficiency of the upgrading process of the charging socket.

In order that the above and other objectives, features and advantages of the present disclosure can be more readily understood, exemplary embodiments of the present disclosure will be described in detail below with reference to the drawings.

BRIEF DESCRIPTION OF THE DRAWINGS

In order to more clearly explain the technical solutions in the embodiments of the present disclosure or in the prior art, the drawings to be used in the description of the embodiments or the prior art will be briefly introduced as follows. Obviously, the drawings concerned in the following description only illustrate some embodiments of the present disclosure, and those of ordinary skill in the art can obtain other drawings from them without paying any creative labor.

FIG. 1 illustrates a (first) flowchart of a charging socket upgrading method according to an embodiment of the present disclosure;

FIG. 2 illustrates a second flowchart of a charging socket upgrading method according to an embodiment of the present disclosure;

FIG. 3 illustrates a flowchart of judging whether an upgrade is successful according to an embodiment of the present disclosure;

FIG. 4 illustrates a third flowchart of a charging socket upgrading method according to an embodiment of the present disclosure;

FIG. 5 illustrates a fourth flowchart of a charging socket upgrading method according to an embodiment of the present disclosure;

FIG. 6 illustrates a flowchart of judging whether an upgrade time of a charging socket is selectable according to an embodiment of the present disclosure;

FIG. 7 illustrates a flowchart of determining a standard state interval according to an embodiment of the present disclosure;

REFERENCE SIGNS

Figure 8:
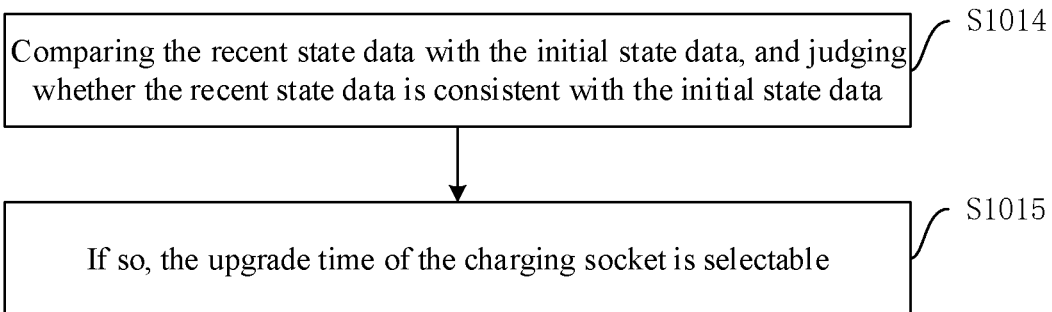
FIG. 8 illustrates a flowchart of judging whether an upgrade time of a charging socket is selectable according to an embodiment of the present disclosure.

1: charging socket;
2: central control module;
3: monitoring module;
4: automobile control unit;
100: receiving module;
200: upgrading module;
300: judging module;
1102: computer device;
1104: processor;
1106: memory;
1108: drive mechanism;
1110: input/output module;
1112: input device;
1114: output device;
1116: presentation device;
1118: graphical user interface;
1120: network interface;
1122: communication link;
1124: communication bus.

DETAILED OF THE EMBODIMENTS

The technical solutions in the embodiments of the present disclosure will be clearly and completely described below in conjunction with the drawings for the embodiments of the present disclosure. Obviously, those described are merely part, rather than all, of the embodiments of the present disclosure. Based on the embodiments of the present disclosure, any other embodiment obtained by those of ordinary skill in the art without paying any creative labor should fall within the protection scope of the present disclosure.

With the rapid development of new energy industry, the number of electric automobiles is gradually increasing, and the demand for safety, reliability and timeliness of charging devices is also increasing. An automobile control unit (ECU) is equivalent to the brain of an automobile, and is connectable to electronic components on the automobile. A unified diagnosis service (UDS) of the automobile is a unified international standard formulated to realize an automobile electronic fault diagnosis service, and the ECU and the 20 electronic components need to be communicated with each other under the UDS.

A charging socket is an apparatus mounted on the electric automobile and connected to a charging interface. The charging socket itself may be damaged due to a too high or too low temperature, a vibration, an impact or the like. In the existing electric automobiles, the charging socket not only has the function of charging through a connection with the charging interface, but also can monitor part of the states of the charging socket.

However, in the prior art, only the state of the charging socket can be monitored, and there is no method for upgrading the charging socket. In actual work and life, the charging socket should be upgraded by a service unit of a background of the manufacturer of the electric automobile when necessary, so as to solve the possible loopholes in the processes of charging, monitoring, etc. inside the charging socket in time. Therefore, there is an urgent need for a charging socket upgrading method to upgrade the charging socket.

In order to solve the above problem, an embodiment of the present disclosure provides a charging socket upgrading method, which can upgrade a charging socket. FIG. 1 illustrates a schematic diagram of the steps of a charging socket upgrading method according to an embodiment of the present disclosure. The specification provides the operation steps of the method as described in the embodiment or the flowchart, but more or less operation steps may be included based on conventional or non-creative labor. The order of steps listed in the embodiment is only one of various steps execution orders, and does not represent a unique execution order. When being executed in an actual system or apparatus product, the steps may be executed sequentially or in parallel according to the method illustrated in the embodiment or the drawing.

The charging socket is mounted on the electric automobile. When the electric automobile is charged, a charging pile is connected to a charging connector through a charging cable, and the charging connector is plugged into the charging socket to charge the electric automobile. The charging socket is provided with a monitoring module capable of monitoring state information of the charging socket and a central control module electrically connected to the monitoring module, and the monitoring module may include a temperature monitoring module, a voltage monitoring module, a socket lock monitoring module and a charging indicator lamp monitoring module.

In which, the central control module is electrically connected to the automobile control unit (ECU) of the electric automobile. The temperature monitoring module mainly monitors the temperatures of terminals and wires during charging. The voltage monitoring module mainly monitors a charging voltage during charging. The charging interface is locked in the charging socket by the socket lock during charging, and the socket lock monitoring module monitors whether the socket lock has locked. During charging, the charging indicator lamp indicates whether charging is being performed, and the charging indicator lamp monitoring module monitors a charging state. The central control module may be a single chip microcomputer, and may be provided with a memory and a processor. The memory may store the state information monitored by the monitoring module, and the processor may transmit the state information to the ECU.

In order to ensure the normal use of the electric automobile, the manufacturer thereof needs to upgrade the charging socket regularly. During upgrade, an upgrade package may be transmitted by a service unit of a background of the manufacturer. The upgrade content may include improving the accuracy of temperature monitoring by the temperature monitoring module, adjusting the brightness and color of the charging indicator lamp, etc., in which the service unit may be a server.

The service unit transmits the upgrade package to the ECU, which judges whether the upgrade time of the charging socket is selectable to further determine the upgrade time, and upgrades the charging socket at the upgrade time. It is necessary to verify whether the charging socket is normal through verification data before the upgrade, and the upgrade is carried out after a successful verification. During upgrade, an old application program will be firstly backed up to a memory backup area. If the upgrade is unsuccessful, the old application program in the memory backup area will be restored. By this method, it is possible to upgrade the charging socket, improve the applicability of the upgrading process, and ensure the safety in the upgrading process.

FIG. 1 illustrates a charging socket upgrading method applied to an automobile control unit, including:

S001: receiving a new application program in an upgrade package, and checking whether the new application program in the upgrade package is valid;

S002: if so, writing the new application program in the upgrade package into a memory activation area of the charging socket for an upgrade;

S003: judging whether the upgrade is successful, and if so, setting a flag position of the charging socket to mark the success of the upgrade.

Further, if the new application program in the upgrade package is valid, an upgrade may be carried out; during the upgrade, before the new application program in the upgrade package is written into the memory activation area of the charging socket, the old application program in the memory activation area of the charging socket is backed up to a memory backup area of the charging socket, and then the old application program in the memory activation area of the charging socket is cleared to receive the new application program in the upgrade package.

Specifically, whether the new application program in the upgrade package is valid may be checked by the ECU. The checking method may be checking the new application program through a corresponding checking algorithm to determine that there are no loopholes such as program defects in the new application program, and of course, other checking methods are also possible, which are not limited herein. In order to prevent the situation that there is no executable application program in the entire charging socket when the upgrade of the application program of the charging socket is failed, the old application program may be firstly backed up in the backup area, and then the old application program in the activation area may be cleared. When the upgrade is successful, the old application program in the backup area may be cleared to save the storage space, and then the flag position is set to 1. In an initial state, after receiving an upgrade instruction, the ECU sets the flag position of the charging socket to 0. A flag position of 0 indicates that there is an upgrade instruction at this time, but the upgrade has not been carried out, and the charging socket needs to be upgraded. A flag position of 1 indicates that the upgrade is successful at this time, which has a function of marking the upgrade state and may serve as the basis for other subsequent applications.

In another embodiment of the present disclosure, if the new application program in the upgrade package is valid, the new application program in the upgrade package is written into a upgrade storage area of the charging socket, a storage address of the new application program is loaded after the automobile control unit restarts, and the old application program before the automobile control unit restarts is used as a backup.

In which, writing the new application program in the upgrade package into the memory activation area of the charging socket for an upgrade includes:

receiving an upgrade starting instruction;

writing the new application program in the upgrade package into the memory activation area of the charging socket for an upgrade according to the upgrade starting instruction;

receiving an upgrade ending instruction; and stopping writing the new application program in the upgrade package into the memory activation area of the charging socket according to the upgrade ending instruction.

The automobile control unit (ECU) may receive the upgrade starting instruction and the upgrade ending instruction sent by the service unit, and carry out a process of writing the new application program into the memory activation area of the charging socket according to the corresponding instruction.

Referring to FIG. 2, in an embodiment of the present disclosure, the method further includes:

S011: reading hardware information and software information of the charging socket.

S012: determining whether to upgrade the charging socket according to the hardware information and the software information;

S013: if so, backing up an old application program in the memory activation area of the charging socket to a memory backup area of the charging socket, and clearing the old application program in the memory activation area of the charging socket.

Specifically, the above steps S011 to S013 may be executed in parallel with step S001 or one after the other, and the execution order is not limited. The hardware information may be checked by the temperature monitoring module, the voltage monitoring module, the socket lock monitoring module, and the charging indicator lamp monitoring module. The software information may be checked by checking whether an application program running inside the charging socket is error-free and complete. The upgrade will not be carried out unless the hardware information and the software information pass the check.

Referring to FIG. 3, further, in an embodiment of the present disclosure, judging whether the upgrade is successful includes:

S021: receiving an initial checksum and a termination checksum corresponding to the new application program in the upgrade package;

S022: calculating the initial checksum corresponding to the new application program in the upgrade package, and determining a standard checksum corresponding to the new application program in the upgrade package;

S023: judging whether the termination checksum is consistent with the standard checksum; and S024: if so, the upgrade is successful.

Specifically, the new application program in the upgrade package carries an initial checksum. As the new application program is written into the memory activation area of the charging socket, the initial checksum may be affected by factors such as the reading of the program. After the new application program is written, the initial checksum may change to form a termination checksum. The ECU may receive the initial checksum and the termination checksum, and then calculate the initial checksum according to SHA256 algorithm to obtain a standard checksum. If there is no problem or abnormality in the writing process of the new application program and the upgrade is successful, the termination checksum should be consistent with the standard checksum, and if not, it means that there is a problem in the writing process of the new application program, that is, the upgrade is unsuccessful.

In the embodiment of the present disclosure, before the upgrade, the charging socket may be woken up by being subjected to a power-on or wake-up operation by the ECU, and then enter a programming diagnosis session after the wakeup. In a case where it is checked that the new application in the upgrade package is valid and the hardware information and software information of the charging socket are normal, the old application program in the memory activation area of the charging socket is backed up to the memory backup area of the charging socket, and the old application program in the memory activation area of the charging socket is cleared.

Before the new application program is written, the charging socket may send to the ECU a command which requests writing, and after receiving the command, the ECU sends a corresponding request instruction to the service unit. At this time, the service unit sends back the upgrade starting instruction to the ECU, and the ECU writes the new application program in the upgrade package into the memory activation area of the charging socket for an upgrade. After the upgrade is completed, the charging socket may send to the ECU a command which requests exiting, and after receiving the command, the ECU may send a corresponding request instruction to the service unit. At this time, the service unit sends back the upgrade ending instruction to the ECU, and the ECU stops writing the new application program in the upgrade package into the memory activation area of the charging socket. The ECU may receive the initial checksum and the termination checksum, then calculate the initial checksum according to the SHA256 algorithm to obtain the standard checksum, confirm that the upgrade is successful after judging that the standard checksum is consistent with the termination checksum, and set the flag position of the charging socket to mark the success of the upgrade.

Referring to FIG. 4, before receiving the new application program in the upgrade package, the method further includes:

S101: receiving an upgrade instruction, and judging whether an upgrade time of the charging socket is selectable according to initial state data and recent state data of the charging socket;

S102: if so, selecting the upgrade time from given time;

S103: if not, determining a default time as the upgrade time; and

S104: upgrading the charging socket through the upgrade package transmitted by a service unit at the upgrade time.

When the ECU receives the upgrade instruction sent by the service unit, because the automobile may be in a travelling state or the owner needs the automobile urgently, the ECU judges whether the upgrade time of the charging socket is selectable according to the initial state data and the recent state data. If the upgrade time of the charging socket is selectable, the upgrade time may be selected by the owner or directly at random from given time, in which the given time may be preset in advance, such as 1 hour later, 2 hours later, etc. Generally, the given time is within 12 or 24 hours. If the upgrade time of the charging socket is not selectable, default time is determined as the upgrade time, in which the default time may be preset in advance, such as 30 seconds later. Generally, the default time has a short interval, so as to upgrade and update in time. Through this method, the upgrade time can be selected according to the need of the owner and the state of the automobile, and the charging socket can be upgraded at an appropriate upgrade time. This process not only ensures the safety of charging to upgrade timely and efficiently, but also meets the actual needs.

In the embodiment of the present disclosure, before step S101, the ECU may acquire a hardware version and a software version of the charging socket, acquire version information in the upgrade package transmitted by the service unit, and compare the hardware version and the software version of the charging socket with the version information in the upgrade package. If the existing version type is consistent with the version type in the upgrade package after comparison, and the existing version level is lower than the version level in the upgrade package, step S104 may be performed, so as to ensure correct and appropriate upgrade of the charging socket and improve the quality and effect of the upgrade.

Referring to FIG. 5, in an embodiment of the present disclosure, before step S101 of judging whether an upgrade time of the charging socket is selectable according to initial state data and recent state data of the charging socket, the method further includes:

S201: receiving verification data used by the service unit to upgrade the charging socket, sending the verification data to the charging socket, and receiving encrypted data returned by the charging socket;

S202: sending the encrypted data to the service unit, when the service unit determines that the encrypted data is the same as the verification data after decryption; and S203: judging whether an upgrade time of the charging socket is selectable according to initial state data and recent state data of the charging socket.

Specifically, the ECU performs encryption verification: after receiving the verification data sent by the service unit, the ECU sends the verification data to the charging socket, and the charging socket carries out an encryption to obtain and send encrypted data to the ECU; after receiving the encrypted data, the ECU sends the encrypted data to the service unit, and the service unit decrypts the encrypted data and compares the decrypted data the verification data. If the encrypted data is the same as the verification data, the verification is successful, and then the subsequent step S101 can be carried out. In this encryption verification process, the charging socket and the service unit share an encryption system, so the encryption of the charging socket and the decryption of the service unit are corresponding to each other, which can verify whether the charging socket is corresponding to the service unit, thereby ensuring the safety of the upgrade of the charging socket.

Referring to FIG. 6, in an embodiment of the present disclosure, judging whether an upgrade time of the charging socket is selectable according to initial state data and recent state data of the charging socket includes:

S1011: determining a standard state interval according to the initial state data of the charging socket;

S1012: judging whether the recent state data of the charging socket is within the standard state interval; and S1013: if so, the upgrade time of the charging socket is selectable.

In which, the state data may include temperature state data, voltage state data, charging indicator lamp state data and socket lock state data, and the selection time of the initial state data of the charging socket may be a preset time period corresponding to the time just when the electric automobile leaves the factory, and the initial state data indicates a state of the above state data just when the electric automobile leaves the factory. Since all kinds of performances of the electric automobile are in an optimal state when the electric automobile just leaves the factory, the state data corresponding to this time period is selected as the initial state data, which may be used as a benchmark of various state performances later, thereby determining the standard state interval.

Next, it is further judged whether the recent state data of the charging socket is within the standard state interval, and the recent state data may be the corresponding state data of one week, three days or the like before the upgrade instruction is received, because the recent state data of the latest time period can reflect the latest state of the charging socket. Finally, if the recent state data is within the standard state interval, the upgrade time of the charging socket is selectable, that is, the recent state of the charging socket is similar to that when just leaving the factory, which means that the state of the charging socket is still good and can be used as a criterion for judging whether the upgrade time of the charging socket is selectable.

Referring to FIG. 7, in an embodiment of the present disclosure, determining a standard state interval according to the initial state data of the charging socket in step S1011 includes:

S1011a: eliminating abnormal data in the initial state data of the charging socket;

S1011b: determining a standard value and an error value of the initial state data; and S1011c: determining the standard state interval according to the standard value and the error value.

Specifically, when the electric automobile just leaves the factory, it is inevitable that there is some abnormal data in the acquired initial state data of the charging socket due to artificial or natural factors. These abnormal data may be manifested as a sudden increase or drop in the temperature, a short-term extinction of the charging indicator lamp, and so on. However, because being not caused by the problems of the charging socket itself, these abnormal data is not representative and needs to be eliminated. An isolated forest model may be adopted to eliminate the abnormal data.

After the abnormal data is eliminated, the standard value and the error value of the initial state data may be determined. Specifically, since obeying a normal distribution, the initial state data conforms to a normal distribution curve, and an expected value u and a variance $\sigma$ of the initial state data may be determined through the normal distribution curve, thereby determining the expected value as the standard value of the initial state data according to the actual demand, and determining the one-time variance, the two-time variance or the three-time variance as the error value of the initial state data. In which, when the one-time variance, the two-time variance or the three-time variance is taken as the error value of the initial state data, the size of the determined standard state interval is different; in principle, the standard state interval determined by taking the one-time variance as the error value is smaller than that determined by taking the two-time variance as the error value, and the standard state interval determined by taking the two-time variance as the error value is smaller than that determined by taking the three-time variance as the error value.

The probability that the recent state data falls within the standard state interval increases as the range of the standard state interval extends, so the range of the standard state interval may be selected according to the actual demand. If the requirement for accuracy is high and the requirement for inclusiveness is low, the one-time variance may be selected as the error value; and if the requirement for accuracy is low and the requirement for inclusiveness is high, the three-time variance may be selected as the error value, thereby meeting different requirements for accuracy and inclusiveness.

It should be noted that for the state data such as the temperature or the voltage, the temperature or the voltage is varied at different time points and obeys the normal distribution, and the standard state interval may be determined in the above way. However, for the state data of the charging indicator lamp, the socket lock, etc., there are only two states of on or off, and locked or unlocked at different time points, and the standard state interval cannot be determined in the above way. For such state information, taking the state information of the charging indicator lamp as an example, the abnormal data may be 0, which indicates that the charging indicator lamp is Off or flickering, the standard value may be 1, which indicates that the charging indicator lamp is on, the error value is set to 0, that is, no error is allowed, and the standard state interval is determined through the standard value and the error value.

Further, determining the standard state interval according to the standard value and the error value includes:

determining a difference between the standard value and the error value as a left end point value of the standard state interval, and determining a sum of the standard value and the error value as a right end point value of the standard state interval.

Specifically, the standard state interval is determined by the following formula:

$$M \in [A - B, A + B];$$

where M denotes the standard state interval, A denotes the standard value and B denotes the error value.

Specifically, if $\sigma$ (one-time variance) is taken as the error value of the initial state data, the standard state interval may be determined as $[\mu-\sigma, \mu+\sigma]$; if $2\sigma$ (two-time variance) is taken as the error value of the initial state data, the standard state interval may be determined as $[\mu-2\sigma, \mu+2\sigma]$; and if $3\sigma$ (three-time variance) is taken as the error value of the initial state data, the standard state interval may be determined as $[\mu-3\sigma, \mu+3\sigma]$.

It should be noted that the standard state interval may be determined by the aforementioned method for the state data such as the temperature or the voltage, and the standard state interval may be determined as [1, 1] for the state data of the charging indicator lamp, the socket lock, etc., where 1 indicates that the charging indicator lamp is on or the socket lock has locked.

Referring to FIG. 8, further, in an embodiment of the present disclosure, judging whether an upgrade time of the charging socket is selectable according to initial state data and recent state data of the charging socket includes:

S1014: comparing the recent state data with the initial state data, and judging whether the recent state data is consistent with the initial state data;

S1015: if so, the upgrade time of the charging socket is selectable.

In which, within a time period after the electric automobile leaves the factory, the state data corresponding to the charging socket at any time point is selected as the initial state data. When a time point is to be selected, it is necessary to ensure that the state of the charging socket at the time point is good and there is no abnormal situation, so that the state data is representative.

Further, it is judged whether the recent state data is consistent with the initial state data, and for the state data of the temperature and the voltage, the consistency here may not be completely the same, and the state data is considered to be consistent within an allowable error range. For example, the temperature error range may be set at +0.1° C., and the temperature in the initial state data may be set at 10° C., then consistency can be determined within a range of 9.9° C. to 10.1° C. However, for the state data of the charging indicator lamp and the socket lock, the consistency here may be completely the same, and there is no allowable error range; the consistency can be determined only when the state data of the charging indicator lamp is consistent with the initial state data thereof, i.e., both being 1 (the charging indicator lamp is on), or the state data of the socket lock is consistent with the initial state data thereof, i.e., both being 1 (the socket lock has locked).

Further, the method further includes: when the upgrade is failed, restoring the old application program in the memory backup area of the charging socket to the memory activation area of the charging socket.

If the upgrade is failed, the flag position is 0, and the old application program in the backup area is restored to the activation area. At this time, the flag position is still 0, which indicates that there is an upgrade instruction at this time, but the upgrade has not been carried out (the upgrade is unsuccessful), and the charging socket needs to be upgraded.

Through the above series of steps, the recent state data of the charging socket may be compared with the initial state data to judge whether the charging socket can select the upgrade time thereof. If the recent state data is within the standard state interval determined by the initial state data, or the recent state data is consistent with the initial state data, the upgrade time of the charging socket is selectable to improve the interactivity and availability of the system. Otherwise, it is necessary to determine the default time as the upgrade time to improve the safety of the system and ensure that the charging socket can complete the charging task with high performance and quality. When the upgrade time comes, the backup may be performed prior to the upgrade, so as to prevent the situation that the upgrade of the charging socket is unsuccessful. Even if the upgrade is unsuccessful, the old application program can be continued, so as to avoid a process of waiting for the subsequent maintenance and upgrade indefinitely due to the unsuccessful upgrade, thereby improving the upgrade efficiency of the charging socket.

Figure 9:
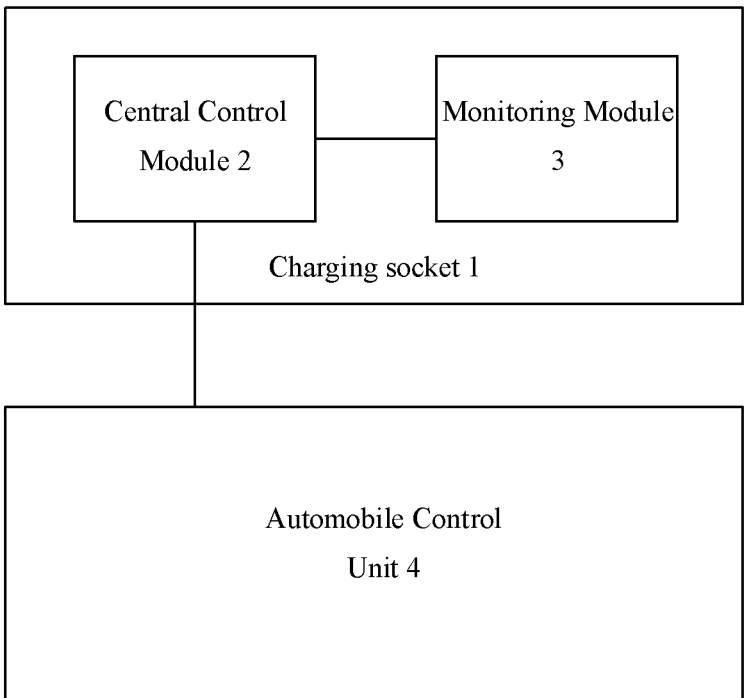
FIG. 9 illustrates a modular structural diagram of a charging socket according to an embodiment of the present disclosure.

Referring to FIG. 9, based on the aforementioned charging socket upgrading method, it is necessary to design a charging socket so that the charging socket upgrading method carries out an upgrade based on the charging socket, in which the charging socket 1 includes a central control module 2 and a monitoring module 3 electrically connected thereto;

the monitoring module 3 is configured to collect state information of the charging socket 1 and transmit the state information to the central control module 2; and the central control module 2 is electrically connected to an automobile control unit 4, and configured to transmit the state information to the automobile control unit 4 and upgrade at an upgrade time under the control of the automobile control unit 4.

Specifically, the monitoring module 3 may include a temperature monitoring module, a voltage monitoring module, a socket lock monitoring module and a charging indicator lamp monitoring module. The temperature monitoring module mainly monitors the temperatures of terminals and wires during charging. The voltage monitoring module mainly monitors a charging voltage during charging. The charging interface is locked in the charging socket by the socket lock during charging, and the socket lock monitoring module monitors whether the socket lock has locked. During charging, the charging indicator lamp indicates whether charging is being performed, and the charging indicator lamp monitoring module monitors a charging state.

Based on the aforementioned charging socket upgrading method, an embodiment of the present disclosure further provides a charging socket upgrading apparatus. The apparatus may include a system (including a distributed system), software (application), a module, a component, a server, a client, etc. using the method described in the embodiment of the present disclosure, and may be combined with a necessary hardware implementation device. Based on the same innovative concept, the apparatus provided by the present disclosure is described in one or more embodiments below. Since the implementation solution for the apparatus to solve the problem is similar to that of the method, the implementation of the specific apparatus of the embodiment of the present disclosure may refer to the implementation of the aforementioned method, and the repeated content is omitted. As used below, the term 'unit' or 'module' may be a combination of software and/or hardware that implements a predetermined function. Although the apparatus described in the following embodiment is exemplarily implemented by software, the implementation by hardware, or a combination of software and hardware, is also possible and contemplated.

Figure 10:
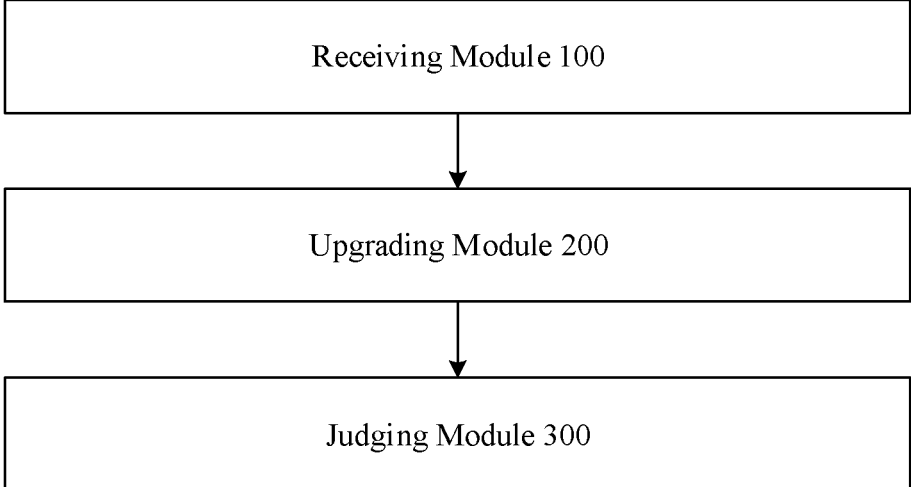
FIG. 10 illustrates a modular structural diagram of a charging socket upgrading apparatus according to an embodiment of the present disclosure.

Specifically, FIG. 10 illustrates a modular structural diagram of a charging socket upgrading apparatus according to an embodiment of the present disclosure. Referring to FIG. 10, the charging socket upgrading apparatus according to the embodiment of the present disclosure includes a receiving module 100, an upgrading module 200 and a judging module 300.

A charging socket upgrading apparatus applied to an automobile control unit, including:

a receiving module 100 configured to receive a new application program in an upgrade package and check whether the new application program in the upgrade package is valid;

an upgrading module 200 configured to write the new application program in the upgrade package into a memory activation area of the charging socket for an upgrade, if the new application program in the upgrade package is valid; and a judging module 300 configured to judge whether the upgrade is successful, and if so, set a flag position of the charging socket to mark the success of the upgrade.

Further, the apparatus also includes a backup module configured to, if the upgrade is carried out, before the new application program in the upgrade package is written into the memory activation area of the charging socket, back up an old application program in the memory activation area of the charging socket to a memory backup area of the charging socket, and clear the old application program in the memory activation area of the charging socket to receive the new application program in the upgrade package.

Further, the apparatus also includes an upgrade conduction module configured to, if the new application program in the upgrade package is valid, write the new application program in the upgrade package into an upgrade storage area of the charging socket, load a storage address of the new application program after the automobile control unit restarts, and take the old application program before the automobile control unit restarts as a backup.

Further, the upgrading module 200 includes:

an upgrade instruction receiving module configured to receive an upgrade starting instruction; and a direct upgrading module configured to write the new application program in the upgrade package into the memory activation area of the charging socket for an upgrade, according to the upgrade starting instruction.

Figure 11:
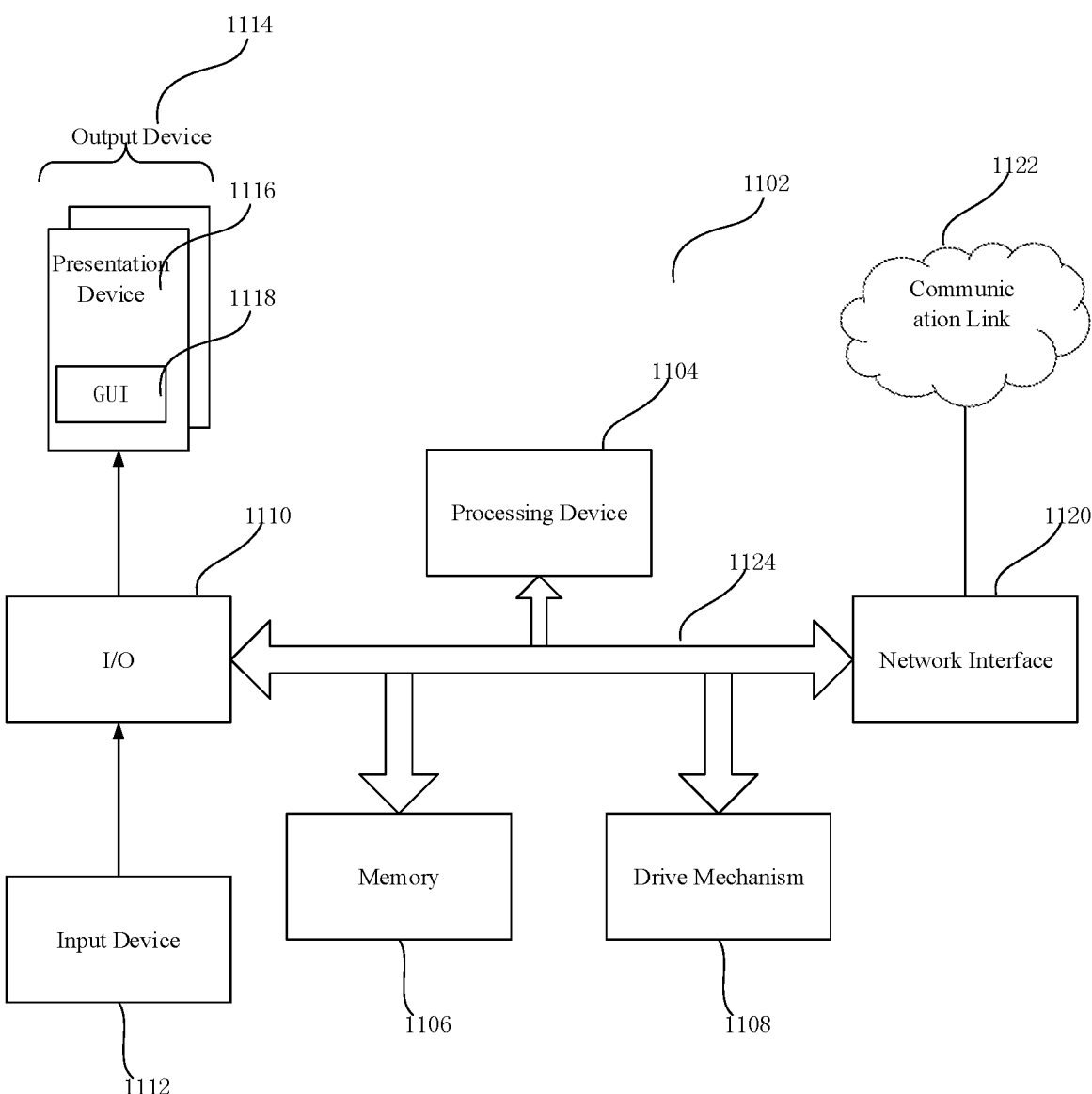
FIG. 11 illustrates a structural diagram of a computer device according to an embodiment of the present disclosure.

Referring to FIG. 11, based on the aforementioned charging socket upgrading method, an embodiment of the present disclosure further provides a computer device 1102 in which the aforementioned method runs. The computer device 1102 may include one or more processors 1104, such as one or more central processing units (CPUs) or graphics processors (GPUs), each of which may implement one or more hardware threads. The computer device 1102 may further include any memory 1106 configured to store any type of information such as codes, settings, data, etc. In a specific embodiment, the computer device may further include a computer program in the memory 1106 and executable in the processor 1104, in which instructions according to the aforementioned method may be executed when the computer program is executed by the processor 1104. Without limitation, for example, the memory 1106 may include any one or combinations of any type of RAM, any type of ROM, a flash memory device, a hard disk, an optical disk, etc. More generally, any memory can use any technology to store information. Further, any memory may provide a volatile or nonvolatile retention of information. Further, any memory may represent a fixed or removable component of the computer device 1102. In one case, when the processor 1104 executes associated instructions stored in any memory or combinations thereof, the computer device 1102 may perform any operation of the associated instructions. The computer device 1102 further includes one or more drive mechanisms 1108 for interacting with any memory, such as a hard disk drive mechanism, an optical disk drive mechanism, etc.

The computer device 1102 may further include an input/output (I/O) module 1110 configured to receive various inputs (via an input device 1112) and provide various outputs (via an output device 1114). A specific output mechanism may include a presentation device 1116 and an associated graphical user interface 1118. In other embodiments, the input/output module 1110, the input device 1112, and the output device 1114 may not be included, and the computer device may only serve as the one in a network. The computer device 1102 may further include one or more network interfaces 1120 configured to exchange data with other devices via one or more communication links 1122. One or more communication buses 1124 couple the components described above together.

The communication link 1122 may be implemented in any way, for example, through a local area network, a wide area network (e.g., the Internet), a point-to-point connection, and/or any combination thereof. The communication link 1122 may include any combination of a hardwired link, a wireless link, a router, a gateway function, a name server, etc. governed by any protocol or combinations thereof.

In correspondence with the method in FIGS. 1 to 8, an embodiment of the present disclosure further provides a computer-readable storage medium, in which a computer program is stored, in which when executed by a processor, the computer program performs the steps of the aforementioned method.

An embodiment of the present disclosure further provides a computer-readable instruction, in which when the instruction is executed by a processor, a program therein causes the processor to perform the method illustrated in FIGS. 1 to 8.

It should be understood that in various embodiments of the present disclosure, the sequential numbers of the above processes do not indicate execution orders. The execution order of each process should be determined according to the function and the inherent logic, and should not constitute any limitation to the implementation process of the embodiment of the present disclosure.

It should also be understood that in the embodiment of the present disclosure, the term 'and/or' is merely an association relationship that describes the associated objects, indicating that there may be three relationships. For example, A and/or B may indicate that A exists alone, A and B exist simultaneously, and B exists alone. In addition, the character '/' herein generally indicates that the associated objects are in an 'or' relationship.

It can be clearly understood by those skilled in the art that for the convenience and conciseness of the description, the specific working processes of the systems, apparatuses and units described above can refer to the corresponding processes in the foregoing method embodiments, and will not be repeated here.

When being implemented in the form of a software functional unit and sold or used as an independent product, the integrated unit may be stored in a computer-readable storage medium. Based on such understanding, the essence of the technical solutions of the present disclosure, i.e., portions making contributions to the prior art, or all or part of the technical solutions may be embodied in the form of a computer software product, which is stored in a storage medium and includes several instructions for causing a computer device (e.g., a personal computer, a server, a network device, etc.) to perform all or part of the steps of the methods described in the embodiments of the present disclosure. The foregoing storage medium includes various media that can store program codes, such as a USB flash disk, a mobile hard disk, a Read-Only Memory (ROM), a Random-Access Memory (RAM), a magnetic disk, or an optical disk.

Specific embodiments are used herein to explain the principles and the implementations of the present disclosure, and the descriptions of the above embodiments are only intended to help understanding of the method and the core idea of the present disclosure. Meanwhile, those of ordinary skilled in the art can modify the implementations and the application scope according to the concept of the present disclosure. To sum up, the content of this specification should not be construed as limitations to the present disclosure.

What is claimed is:

1. A charging socket upgrading method, which is applied to an automobile control unit, the method comprising:

receiving a new application program in an upgrade package, and checking whether the new application program in the upgrade package is valid;

if the new application program is valid, writing the new application program in the upgrade package into a memory activation area of the charging socket for an upgrade; and judging whether the upgrade is successful, and if so, setting a flag position of the charging socket to mark the success of the upgrade, wherein before receiving the new application program in the upgrade package, the method further comprises:

receiving an upgrade instruction, and judging whether an upgrade time of the charging socket is selectable according to initial state data and recent state data of the charging socket, determining a standard state interval according to the initial state data of the charging socket;

judging whether the recent state data of the charging socket is within the standard state interval; and if the recent state data of the charging socket is within the standard state interval, determining that the upgrade time of the charging socket is selectable;

if the upgrade time of the charging socket is selectable, selecting the upgrade time from given time;

if the upgrade time of the charging socket is not selectable, determining a default time as the upgrade time; and upgrading the charging socket through the upgrade package transmitted by a service unit at the upgrade time.

2. The charging socket upgrading method according to claim 1, further comprising:

if the upgrade is carried out, before writing the new application program in the upgrade package into the memory activation area of the charging socket, backing up an old application program in the memory activation area of the charging socket to a memory backup area of the charging socket, and clearing the old application program in the memory activation area of the charging socket to receive the new application program in the upgrade package.

3. The charging socket upgrading method according to claim 1, further comprising:

if the new application program in the upgrade package is valid, writing the new application program in the upgrade package into an upgrade storage area of the charging socket, loading a storage address of the new application program after the automobile control unit restarts, and taking the old application program before the automobile control unit restarts as a backup.

4. The charging socket upgrading method according to claim 1, wherein writing the new application program in the upgrade package into a memory activation area of the charging socket for an upgrade comprises:

receiving an upgrade starting instruction; and writing the new application program in the upgrade package into the memory activation area of the charging socket for an upgrade according to the upgrade starting instruction.

5. The charging socket upgrading method according to claim 1, wherein writing the new application program in the upgrade package into a memory activation area of the charging socket for an upgrade comprises:

receiving an upgrade ending instruction; and stopping writing the new application program in the upgrade package into the memory activation area of the charging socket according to the upgrade ending instruction.

6. The charging socket upgrading method according to claim 1, further comprising:

reading hardware information and software information of the charging socket;

determining whether to upgrade the charging socket according to the hardware information and the software information; and if so, backing up an old application program in the memory activation area of the charging socket to a memory backup area of the charging socket, and clearing the old application program in the memory activation area of the charging socket.

7. The charging socket upgrading method according to claim 1, wherein judging whether the upgrade is successful comprises:

receiving an initial checksum and a termination checksum corresponding to the new application program in the upgrade package;

calculating the initial checksum corresponding to the new application program in the upgrade package, and determining a standard checksum corresponding to the new application program in the upgrade package;

judging whether the termination checksum is consistent with the standard checksum; and if so, the upgrade is successful.

8. The charging socket upgrading method according to claim 1, wherein before judging whether an upgrade time of the charging socket is selectable according to initial state data and recent state data of the charging socket, the method further comprises:

receiving verification data used by the service unit to upgrade the charging socket, sending the verification data to the charging socket, and receiving encrypted data returned by the charging socket;

sending the encrypted data to the service unit, when the service unit determines that the encrypted data is the same as the verification data after decryption; and judging whether an upgrade time of the charging socket is selectable according to initial state data and recent state data of the charging socket.

9. The charging socket upgrading method according to claim 1, wherein determining a standard state interval according to the initial state data of the charging socket comprises:

eliminating abnormal data in the initial state data of the charging socket;

determining a standard value and an error value of the initial state data; and determining the standard state interval according to the standard value and the error value.

10. The charging socket upgrading method according to claim 9, wherein determining the standard state interval according to the standard value and the error value comprises:

determining a difference between the standard value and the error value as a left end point value of the standard state interval, and determining a sum of the standard value and the error value as a right end point value of the standard state interval.

11. The charging socket upgrading method according to claim 1, wherein judging whether an upgrade time of the charging socket is selectable according to initial state data and recent state data of the charging socket comprises:

comparing the recent state data with the initial state data, and judging whether the recent state data is consistent with the initial state data;

if so, the upgrade time of the charging socket is selectable.

12. The charging socket upgrading method according to claim 1, further comprising:

when the upgrade is failed, restoring an old application program in a memory backup area of the charging socket to the memory activation area of the charging socket.

13. A charging socket upgrading apparatus, comprising a memory, a processor, and a computer program stored in the memory, wherein the apparatus is applied to an automobile control unit, the apparatus further comprising:

a receiving module configured to receive a new application program in an upgrade package and check whether the new application program in the upgrade package is valid;

an upgrading module configured to write the new application program in the upgrade package into a memory activation area of the charging socket for an upgrade, if the new application program in the upgrade package is valid; and a judging module configured to judge whether the upgrade is successful, and if so, set a flag position of the charging socket to mark the success of the upgrade, wherein before receiving the new application program in the upgrade package, the upgrading module is further configured to:

receive an upgrade instruction, and judge whether an upgrade time of the charging socket is selectable according to initial state data and recent state data of the charging socket, determine a standard state interval according to the initial state data of the charging socket;

judge whether the recent state data of the charging socket is within the standard state interval; and if the recent state data of the charging socket is within the standard state interval, determine that the upgrade time of the charging socket is selectable;

if the upgrade time of the charging socket is selectable, select the upgrade time from given time;

if the upgrade time of the charging socket is not selectable, determine a default time as the upgrade time; and upgrade the charging socket through the upgrade package transmitted by a service unit at the upgrade time.

14. The charging socket upgrading apparatus according to claim 13, further comprising:

a backup module configured to, if the upgrade is carried out, before the new application program in the upgrade package is written into the memory activation area of the charging socket, back up an old application program in the memory activation area of the charging socket to a memory backup area of the charging socket, and clear the old application program in the memory activation area of the charging socket to receive the new application program in the upgrade package.

15. The charging socket upgrading apparatus according to claim 13, further comprising:

an upgrade conduction module configured to, if the new application program in the upgrade package is valid, write the new application program in the upgrade package into an upgrade storage area of the charging socket, load a storage address of the new application program after the automobile control unit restarts, and take the old application program before the automobile control unit restarts as a backup.

16. The charging socket upgrading apparatus according to claim 13, wherein the upgrading module comprises:

an upgrade instruction receiving module configured to receive an upgrade starting instruction; and a direct upgrading module configured to write the new application program in the upgrade package into the memory activation area of the charging socket for an upgrade, according to the upgrade starting instruction.

* * * * *